May 17, 1966  W. F. NEWBOLD ETAL  3,252,080
DIGITALLY ADJUSTABLE ATTENUATOR
Filed May 13, 1963  3 Sheets-Sheet 1

INVENTORS.
WILLIAM F. NEWBOLD
ROBERT D. WILSON
BY *Arthur H. Swanson*
ATTORNEY.

May 17, 1966

W. F. NEWBOLD ETAL 3,252,080

DIGITALLY ADJUSTABLE ATTENUATOR

Filed May 13, 1963

INVENTORS.
WILLIAM F. NEWBOLD
ROBERT D. WILSON
BY Arthur H. Swanson
ATTORNEY.

May 17, 1966 W. F. NEWBOLD ETAL 3,252,080
DIGITALLY ADJUSTABLE ATTENUATOR
Filed May 13, 1963 3 Sheets-Sheet 3
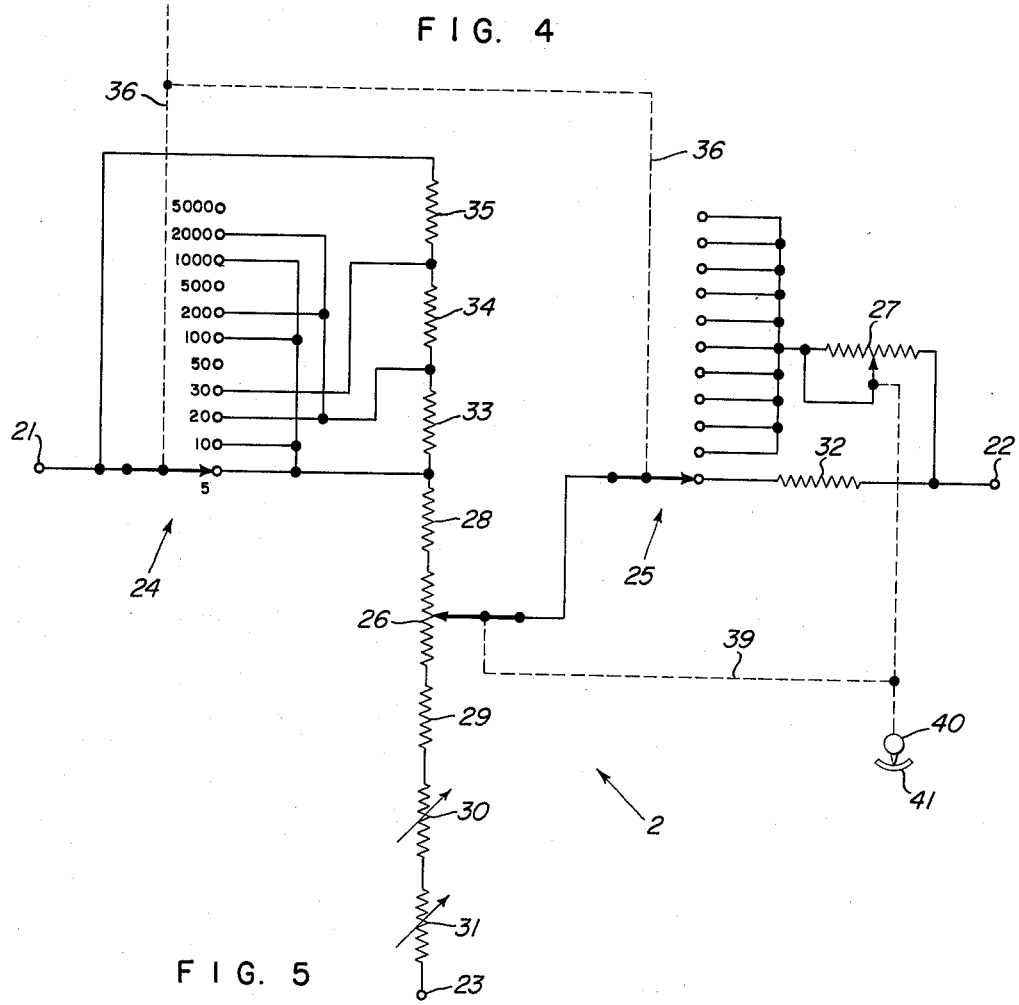
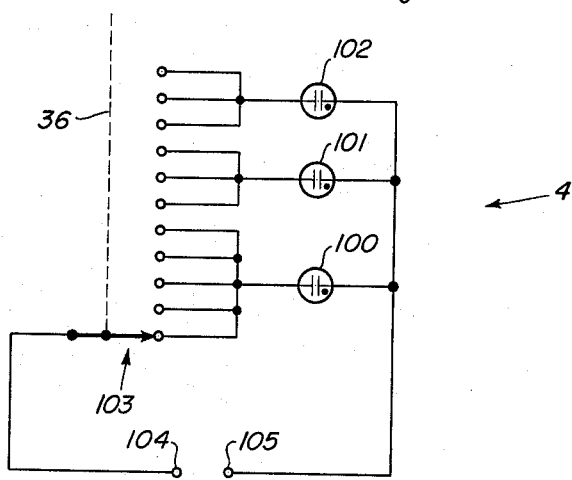
INVENTORS.
WILLIAM F. NEWBOLD
ROBERT D. WILSON
BY Arthur H. Swanson
ATTORNEY.

United States Patent Office 3,252,080
Patented May 17, 1966

3,252,080
DIGITALLY ADJUSTABLE ATTENUATOR
William F. Newbold, Springfield Township, Montgomery County, and Robert D. Wilson, Warminster, Pa., assignors to Honeywell Inc., a corporation of Delaware
Filed May 13, 1963, Ser. No. 280,008
14 Claims. (Cl. 323—74)

The present invention relates generally to apparatus for modifying or conditioning an electrical signal or voltage, and relates specifically to such apparatus for conditioning the output voltage from a transducer or other signal voltage source to make that voltage compatible with the input requirements or range of a given measuring instrument. More specifically, the invention relates to such apparatus which is arranged to effectively adjust the span and suppression or range of a measuring instrument to bring these instrument characteristics into correspondence with the specific range of a voltage to be measured by the instrument.

A general object of the present invention is to provide improved signal or voltage conditioning apparatus of the foregoing type which is characterized by its simplicity and versatility in comparison to the previously known arrangements used for the purpose. A specific object of the invention is to provide such improved apparatus in which is included a novel form of multi-decade, digitally adjustable, digitally indicating suppression voltage source or device which, in combination with the remainder of the apparatus, provides a suppression voltage which is digitally adjustable over an extremely wide range.

A more specific object of the invention is to provide improved apparatus of the type last specified wherein the novel suppression voltage device utilizes substantially fewer resistors per decade than the number of different suppression voltages available in each decade. A still more specific object of the invention is to provide such apparatus wherein a novel bridge configuration for the suppression voltage device avoids the need for extreme values of resistors in the adjusting means for successive decades of the suppression voltage, and also provides a substantially constant output resistance.

An even more specific object of the invention is to provide improved apparatus of the type described above including a novel adjustable, two-part voltage attenuator arrangement by means of which the effective range of the available suppression voltage is increased many times without a corresponding increase in the complexity of the suppression voltage device.

Another specific object of the invention is to provide apparatus of the foregoing type wherein a decimal point display means for the digitally displayed value of the suppression voltage indicates the effect on the value of the suppression voltage of the setting of the attenuator arrangement.

To the end of fulfilling the foregoing and other desirable objects, and of providing a novel voltage conditioning apparatus which has versatility without corresponding complexity, apparatus according to the invention, as exemplified by the specific apparatus embodiment to be described in detail hereinafter, includes a novel voltage adjusting or adjustable suppression voltage device connected in series betwen input and output terminals of the apparatus. This suppression device includes novel digitally adjustable means for permitting the adjustment or setting of the value of suppression voltage, in terms of millivolts, which the device is to algebraically add to an input signal or voltage as it passes from the input terminals to the output terminals of the apparatus. This value of the suppression voltage is indicated digitally, in terms of millivolts, by display means associated with the voltage adjusting means.

Further in accordance with the invention, the suppression voltage device is preceded in the series circuit by a first adjustable voltage attenuator, and is followed by a second such attenuator. These two attenuators together serve as a span adjusting means in the apparatus, while the first attenuator additionally serves to extend or increase the effective range over which the suppression voltage is adjustable. This extension of the effective range of the adjustable suppression voltage is obtained without a corresponding addition to the aforementioned suppression voltage adjusting means or any other portion of the suppression device. The specific effect of the setting of the first attenuator on the effective suppression voltage is indicated by means of decimal point display means which are associated with the aforementioned digital display means for the suppression voltage, but which are controlled by the setting of the first attenuator.

Further to the end of providing a simplified apparatus in accordance with the foregoing objects of the invention, the novel suppression voltage device includes a bridge circuit. Two adjacent arms of this bridge are formed by summing resistors, while the remaining two arms contain the suppression voltage adjusting means for the tens decade. This means consists of four tens resistors, having resistance values in the ratio of 4:2:2:1, and a ten-position switch. These elements are interconnected in a novel manner to cause the four resistors to be switched in and out of the last-mentioned two bridge arms, according to a predetermined binary pattern, to produce ten successive changes of ten millivolts each in the value of the suppression voltage as the tens switch is adjusted through its ten successive positions. Thus, this novel construction requires only four resistors to provide ten equal digital changes in the tens decade suppression voltage, and hence requires a number of resistors which is substantially less than the number of voltage changes provided.

The units and tenths decades of the novel suppression device also make use of the foregoing novel voltage adjusting arrangement, whereby each of these two decades requires only four resistors to produce the ten voltage changes in that decade. Additionally, the need for extremely or impractically high values for the resistors of the units and tenths decades is avoided by connecting the switches and resistors of the adjustable means for these two decades into the bridge circuit by way of the summing resistors, instead of connecting them directly in parallel with the tens decade adjustable means. This permits the resistance values of the four units resistors to be equal to the values of the corresponding tens resistors, and requires the tenths resistors to have resistance values which are only ten times the values of the tens resistors.

A better understanding of the present invention may be had from the following detailed description of one form of voltage conditioning apparatus embodying the invention, which description is to be read in connection with the accompanying drawings, wherein:

FIG. 4 is a schematic circuit diagram of the second attenuator portion of the FIG. 1 apparatus; and FIG. 5 is a schematic circuit diagram of the decimal point display portion of the FIG. 1 apparatus.

THE COMPONENTS OF THE APPARATUS

Figure 1:
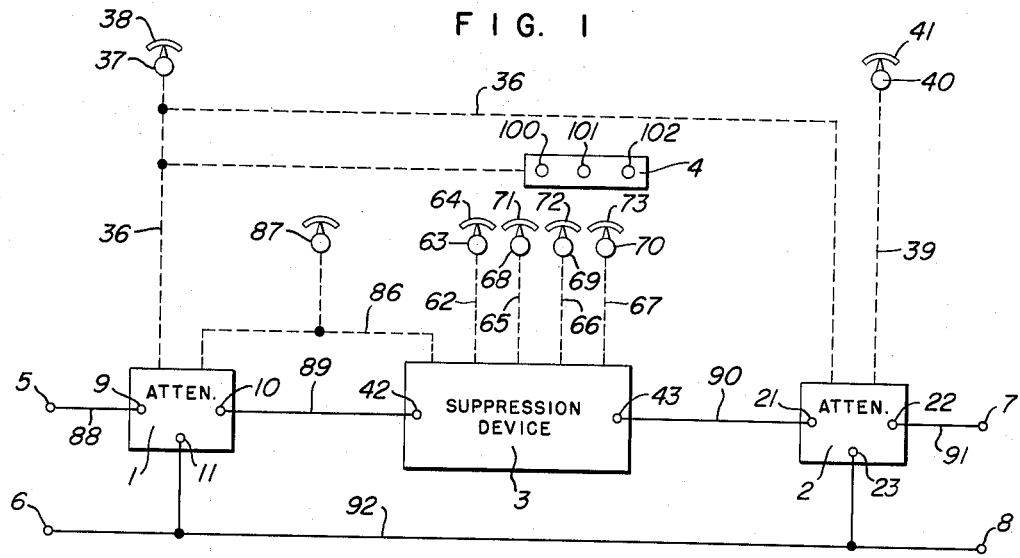
FIG. 1 is an over-all block diagram of the voltage conditioning apparatus.

As can be seen from FIG. 1, the voltage conditioning apparatus embodying the present invention shown herein by way of illustration and example includes a first adjustable voltage attenuator 1 and a second adjustable voltage attenuator 2. The apparatus also includes a suppression voltage device 3, a decimal point display device 4, input terminals 5 and 6, output terminals 7 and 8, and various conductors interconnecting the foregoing elements.

The attenuator 1

Figure 2:
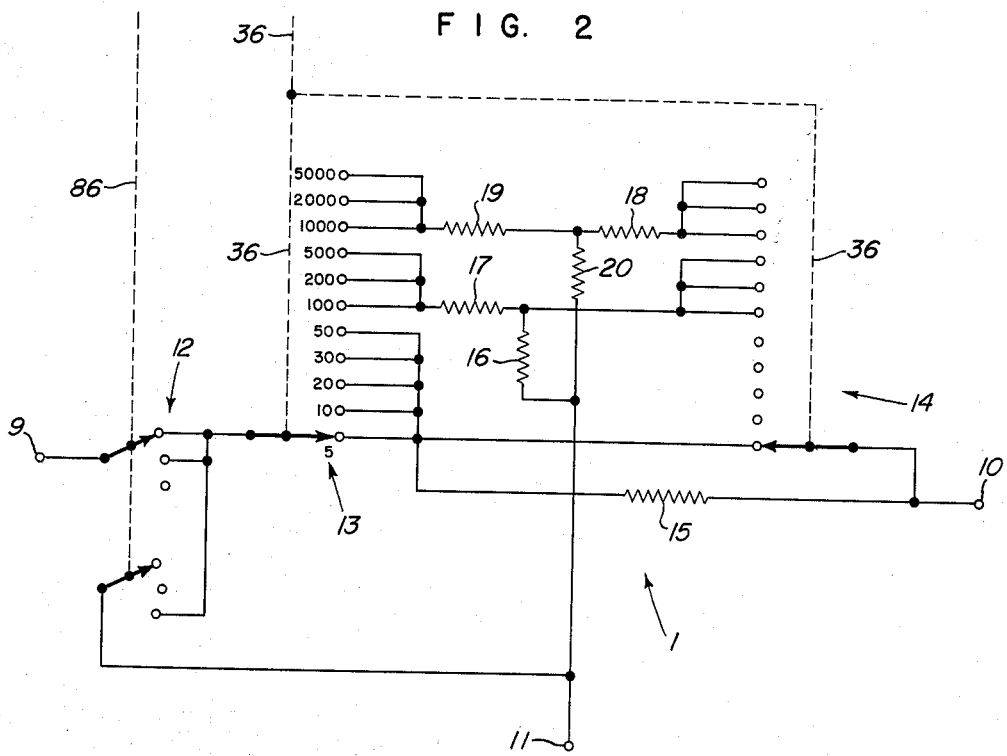
FIG. 2 is a schematic circuit diagram of the first attenuator portion of the FIG. 1 apparatus.

As shown in FIGS. 1 and 2, the attenuator 1 includes an input terminal 9, an output terminal 10, a common terminal 11, a two-pole, three-position polarity and calibration switch 12, a first eleven-contact span switch 13, a second eleven-contact span switch 14, and a plurality of resistors 15, 16, 17, 18, 19, and 20.

The attenuator 2

As shown in FIGS. 1 and 4, the attenuator 2 includes an input terminal 21, an output terminal 22, a common terminal 23, a third eleven-contact span switch 24, a fourth eleven-contact span switch 25, adjustable span multiplier resistors 26 and 27, and resistors 28, 29, 30, 31, 32, 33, 34, and 35. As shown, resistor 26, 27, 30, and 31 are of the adjustable type.

The switches 24 and 25 are ganged together and to the switches 13 and 14 of the attenuator 1 by a suitable mechanical linkage 36. The latter is provided with a pointer knob 37, the manual operation of which adjusts the four span switches 13, 14, 24, and 25 simultaneously. A scale 38, which is suitably calibrated in accordance with the span values provided by the various positions of the switches 13, 14, 24, and 25, cooperates with the knob 37. The adjustable resistors 26 and 27 are span multiplying resistors, and are ganged by a mechanical linkage 39. The latter is provided with a pointer knob 40 and cooperating scale 41.

The supression device 3

Figure 3:
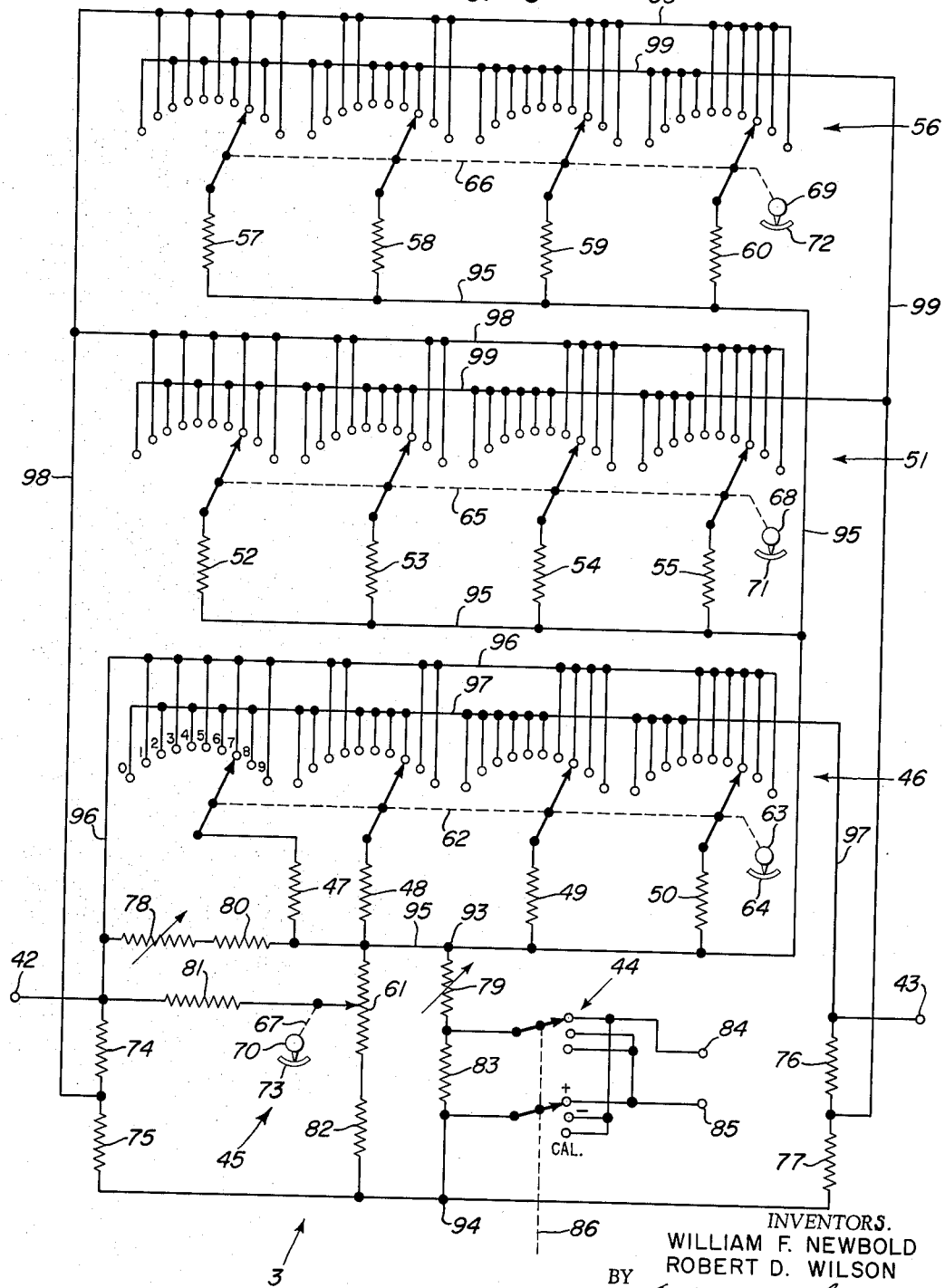
FIG. 3 is a schematic circuit diagram of the suppression voltage producing portion of the FIG. 1 apparatus.

As shown in FIGS. 1 and 3, the suppression voltage producing device 3 includes output or suppression voltage terminals 42 and 43, a second two-pole, three-position polarity and calibration switch 44, multi-decade, digitally-adjustable suppression voltage adjusting means 45 including resistors forming part of a bridge circuit, and other resistors which complete said bridge circuit. The adjustable means 45 includes a four-pole, ten-position, tens decade switch 46 with cooperating tens decade resistors 47, 48, 49, and 50, a four-pole, ten position, units decade switch 51 with cooperating units decade resistors 52, 53, 54, and 55, a four-pole, ten-position, tenths decade switch 56 with cooperating tenths decade resistors 57, 58, 59, and 60, and an adjustable hundredths decade resistor 61.

A linkage 62, with cooperating adjusting knob 63 and tens digital display means 64, serves to permit the adjustment of the tens decade switch 46. Similar linkages 65, 66, and 67, similar knobs 68, 69, and 70, and similar digital display means 71, 72, and 73 are provided for the respective adjustment of the units decade switch 51, the tenths decade switch 56, and the hundredths decade resistor 61.

As shown in FIG. 1, the digital display devices 64, 71, 72, and 73 are grouped in a row so as to provide a decimal-digit indication, in terms of millivolts, of the adjusted value of the suppression voltage to be produced by the device 3. The decimal point display means 4 is so physically positioned with respect to the row of digital devices 64, 71, 72, and 73 that it exhibits a decimal point at the proper position along the row of digits exhibited by the devices 64, 71, 72, and 73.

The aforementioned other resistors which complete the bridge circuit of the device 3 are summing resistors 74, 75, 76, and 77, adjustable calibrating resistors 78 and 79, and miscellaneous resistors 80, 81, 82, and 83. The bridge circuit is supplied with energizing voltage by way of supply terminals 84 and 85, through the switch 44. The latter is ganged with its counterpart 12 in the attenuator 1 by means of a mechanical linkage 86 which is provided with a switch-adjusting knob 87.

The terminals 84 and 85 are arranged to be connected to a suitable source of constant D.C. supply voltage, not shown. As will be explained more fully hereinafter, the device 3 modifies the supply voltage to produce between the suppression voltage or bridge output terminals 42 and 43 a suppression voltage of a value determined by the setting of the voltage adjusting means 45.

DETAILED DESCRIPTION OF THE APPARATUS

Since the purpose of the apparatus being described is to condition an input voltage or signal, applied between the input terminals 5 and 6, to produce between the output terminals 7 and 8, for application to a measuring instrument, an output voltage having span and zero characteristics which are compatible with those of the instrument, the suppression voltage terminals 42 and 43 are connected in a series loop circuit with the input terminals 5 and 6 and the output terminals 7 and 8. Further, the attenuator 1 is inserted in the loop circuit between the input and suppression terminals, while the attenuator 2 is inserted in the loop circuit between the suppression and output terminals. As a result, as the input voltage passes through the apparatus, it is first attenuated by the attenuator 1, is then augmented or diminished by the suppression voltage, depending upon which direction the zero of the input voltage is to be moved, and is then attenuated by the attenuator 2 to provide a conditioned output voltage. Attenuators 1 and 2 cooperate to set the span of the output voltage, while the zero of the latter is set by the adjusted value of the suppression voltage, as modified by the attenuator setting.

The foregoing loop circuit is formed specifically in the following manner. The input terminal 5 is connected by a conductor 88 to the attenuator 1 input terminal 9, while the cooperating output terminal 10 is connected by a conductor 89 to the suppression terminal 42. The other suppression terminal 43 is connected by a conductor 90 to the attenuator 2 input terminal 21, while the cooperating output terminal 22 is connected by a conductor 91 to the apparatus output terminal 7. The circuit is completed by a conductor 92 which is connected between the apparatus input terminal 6 and output terminal 8. The common attenuator terminals 11 and 23 are connected to the conductor 92.

The foregoing series loop circuit can be traced from the input terminal 5 to the terminal 9, thence through the attenuator 1 to the terminal 10, and thence to the terminal 42 and through the device 3 to the terminal 43. From there, the circuit extends to the terminal 21, and through the attenuator 2 to the terminal 22 and to the apparatus output terminal 7. The circuit is then completed by extending from the terminal 8 back to the terminal 6.

The device 3

In the novel suppression voltage-producing or voltage adjusting device 3, the aforementioned bridge circuit has essentially a pair of bridge input or energizing terminals, a pair of bridge output terminals, and bridge arms interconnecting these terminals. The bridge input terminals have been labeled 93 and 94 in FIG. 3, while the bridge output terminals are the suppression voltage terminals 42 and 43.

The bridge input terminals 93 and 94 are effectively connected to the supply terminals 84 and 85. Specifically, the resistors 79 and 83 are connected in series between the terminals 93 and 94, while the terminals 84 and 85 are connected by the switch 44, in all three positions thereof, across the resistor 83. The switch 44 serves to reverse the polarity of the bridge input and output voltages as will be described hereinafter. The resistors 79 and 83 determine what portion of the supply voltage is applied between the terminals 93 and 94 to energize the bridge. The resistor 79 is made adjustable so that this bridge energizing voltage can be adjusted to the value which will cause the suppression voltage to have the desired value when the voltage adjusting means 45 is set to produce and indicate the maximum value of the suppression voltage.

The lower two adjacent arms of the bridge contain the summing resistors 74, 75, 76, and 77. Specifically, the resistors 74 and 75 are connected in series between the input terminal 94 and the output terminal 42, while the resistors 76 and 77 are connected in series between the input terminal 94 and the output terminal 43.

The remaining two, upper bridge arms contain the tens decade resistors 47, 48, 49, and 50 as selectively connected therein by the switch 46. Specifically, the bridge input terminal 93 is connected through a conductor 95 and each of the resistors 47, 48, 49, and 50 to a corresponding one of the four poles or arms of the switch 46, while the forty contacts of this switch are connected in a predetermined pattern to the bridge output terminals 42 and 43 by respective conductors 96 and 97. This connection pattern is such that, as the four switch arms of the switch 46 are advanced by the tens knob 63 from their zero or left-hand position, the resistors 47, 48, 49, and 50 are switched in and out of the two upper bridge arms in such a manner that the net resistance in the upper right-hand arm is progressively increased while the net increase in the upper left-hand arm is simultaneously progressively decreased. The various connections which provide this action will now be discussed.

As is clear from FIG. 3, each of the ten contacts of each of the four sections of the switch 46 is connected either to the conductor 96 or to the conductor 97. Since the connection of each contact to its conductor is clearly shown in FIG. 3, there is no need herein to describe each such connection separately. Instead, it is deemed that an adequate description of the connection pattern for the switch 46 and the resistors 47, 48, 49, and 50 is provided by the following description of the specific resulting circuit for the upper bridge arms which results from each of several specific positions of the switch 46.

Before describing these specific resulting bridge arm circuits, it should be noted that the upper left-hand arm additionally and permanently includes the resistors 78 and 80 connected in series between the input terminal 93 and the output terminal 42. These resistors serve as a means by which the bridge can be balanced, to produce zero suppression voltage, when the voltage adjusting means 45 is set to zero.

When the switch 46 is in its zero position, all four of the resistors 47, 48, 49, and 50 are connected in parallel in the upper right-hand arm. This specific arm circuit can be traced from the input terminal 93 to each of the resistors 47, 48, 49, and 50 by way of the conductor 95, and then through each of said resistors and its associated switch arm and zero contact to output terminal 43 by way of the conductor 97. Under this condition, and neglecting the effects on the bridge of the other decades, to be described hereinafter, only resistors 78 and 80 in the upper left-hand arm, and the resistance of the resistor 78 is then so set that the total resistance in this arm balances the resistance of the resistors 47, 48, 49, and 50 in parallel in the right-hand arm to balance the bridge and to cause zero suppression voltage to be produced between the terminals 42 and 43.

When the switch 46 is moved to its #1 position, representing a suppression voltage of ten millivolts, the resistor 47 is switched from the right-hand arm to the left-hand arm, while the other arm resistors remain connected as before. Therefore, with the switch 46 in its #1 position, the right-hand arm contains the resistors 48, 49, and 50 in parallel, while the left-hand arm now contains the resistor 47 in parallel with the series-connected resistors 78 and 80. Since this switching from the zero to the #1 position has caused parallel resistance to be shifted from the right-hand to the left-hand arm, the total resistance of the right-hand arm is increased, and that of the left-hand arm is decreased. This unbalances the bridge to the extent that a suppression voltage of ten millivolts is produced between the terminals 42 and 43.

When the switch 46 is moved to its #2 position, representing a suppression voltage of twenty millivolts, the resistor 47 is switched back to the right-hand arm, and the resistor 48 is switched from the right-hand arm to the left-hand arm. This leaves the right-hand arm containing the resistors 47, 49, and 50 connected in parallel, and the left-hand arm containing the resistor 48 connected in parallel with the series-connected resistors 78 and 80. Since, in accordance with the invention, the resistances of the resistors 47, 48, 49, and 50 are in a predetermined desired ratio—for example, 4:2:2:1—the above switching from the #1 to the #2 position reduces the net total value of the parallel resistance which has been shifted from the right-hand to the left-hand arm. This further increases the total resistance of the right-hand arm and further decreases that of the left-hand arm. These changes are of the proper extent to again increase the bridge unbalance and the suppression voltage by ten millivolts. This produces a net suppression voltage of twenty millivolts, as is desired.

When the switch 46 is moved to its #3 position, representing a suppression voltage of thirty millivolts, the resistor 47 is switched from the right-hand to the left-hand arm, leaving the right-hand arm containing the resistors 49 and 50 connected in parallel, and leaving the left-hand arm containing the resistors 47 and 48 connected in parallel with the series-connected resistors 78 and 80. This switching from the #2 to the #3 position further reduces the net total value of the parallel resistance which has been shifted from the right-hand to the left-hand arm. This results in a still further increase in the total resistance of the right-hand arm and a still further decrease in that of the left-hand arm. As a result, the bridge unbalance and suppression voltage are increased by another ten millivolts, producing a total suppression voltage of thirty millivolts, as is desired.

The foregoing changes progress as the switch 46 is advanced or adjusted through its successive positions #4 through #9. Finally, the suppression voltage changes back to zero as the switch 46 is moved from its #9 to its zero position.

In summary, it is seen from the foregoing that, as the switch 46 is advanced or adjusted through its successive positions, the net total value of parallel resistance which has been shifted over from the right-hand to the left-hand bridge arm is progressively reduced, and hence becomes progressively smaller, the total resistance of the right-hand arm becomes progressively larger, the total resistance of the left-hand arm becomes progressively smaller, and the bridge output or suppression voltage is progressively increased by successive ten millivolt increments. Specifically, the adjustment of the switch 46 through its ten successive positions causes the suppression voltage to change by ten successive increments of ten millivolts each. Accordingly, this suppression voltage or millivoltage changes from zero to ten, to twenty, to thirty, etc., and then back to zero as the tens switch 46 is adjusted from zero through its ten successive positions.

The units decade switch 51 and resistors 52, 53, 54, and 55, and the tenths decade switch 56 and resistors 57, 58, 59, and 60, are interconnected in exactly the same manner as for the tens switch and resistors as just described. Instead of being connected directly in parallel with the tens decade elements directly in the upper bridge arms between the upper bridge arm conductors 96 and 97, however, the units and tenths decade elements are connected, by way of conductors 98 and 99, in parallel between the bridge energizing terminal 93 and the junctions between the summing resistors 74 and 75, and 76 and 77. Specifically, one end of each of the resistors 52 through 55 and 57 through 60 is connected to the terminal 93 by the conductor 95, while the contacts of the switches 51 and 56 are connected by the conductor 98 to the junction between the resistors 74 and 75, and by the conductor 99 to the junction between the resistors 76 and 77. Thus, the resistors 75 and 77 serve as summing resistors for the units and tenths decades, while the resistors 74 and 76 are the summing resistors for the tens decade.

The foregoing novel connection of the units and tenths decade resistors into the bridge circuit in accordance with the present invention provides a distinct practical advantage. If the conductors 98 and 99 had been directly connected to the bridge output terminals 42 and 43 as the tens decade conductors 96 and 97 are connected, the units and tenths decade resistors would have been connected in parallel with the tens decade resistors directly in the two upper bridge arms. If this had been done, the units resistors 52 through 55 would have had to have resistance values which were ten times those of the tens resistors, while the tenths resistors 57 through 60 would have had to have values which were one-hundred times the values of the tens resistors. Since, in practice, the tens resistor 47 may well have a value of the order of 250K ohms, this would have required that the tenths resistor 57 have a value of 25 megohms. This is obviously an undesirable situation, considering the fact that the decade resistors must be of the high precsion type.

By virtue of the above-described novel connection of the units and tenths decade resistors into the bridge circuit by way of the summing resistors, however, the foregoing disadvantage of requiring high values of high precision resistors is avoided. Specifically, the novel connections described permit the units resistors to have resistance values which are equal to those of the tens resistors, and permit the tenths resistors to have resistance values which are only ten times those of the tens and units resistors. The practical significance of this advantage is believed to be obvious.

In the same basic manner as that described hereinbefore in connection with the tens decade, the adjustment of the units switch 51 through its tens successive positions switches the resistors 52 through 55 back and forth in the bridge circuit to cause the suppression voltage to change by ten successive increments of one millivolt each. Thus, when the other decades are set at zero, the suppression millivoltage changes from zero to one, to two, to three, etc., and then back to zero as the switch 51 is adjusted from zero through its ten successive positions.

Similarly, the adjustment of the units switch 56 through its ten successive positions switches the resistors 57 through 60 back and forth in the bridge circuit to cause the suppression voltage to change by ten successive increments of one-tenth millivolt each, and thus causes the suppression millivoltage to change from zero to one-tenth, to two-tenths, to three-tenths, etc., assuming that the other decades are set at zero.

Two hundredths decade adjustable resistor 61, which completes the adjustable means 45, has its resistance portion connected in series with the resistor 82 between the bridge energizing terminals 93 and 94. The resistor 82 prevents the resistor 61 from unbalancing the bridge when the resistor 61 is at its zero position. The adjustable contact of the resistor 61 is connected through the current-limiting resistor 81 to the bridge output terminal 42. The adjustment of the resistor 61 from one end of its travel to the other varies the suppression millivoltage by ten one-hundredths, or one-tenth, whereby the hundredths digital display means 73 is arranged to display the digits one through ten in the hundredths position of the displayed suppression voltage value.

Before concluding this detailed description of the device 3, it is noted that the zero, bridge-balancing adjustment of the resistor 78 balances not only the zero-position resistances introduced into the bridge by the tens decade resistors, as explained hereinbefore, but also balances the zero-position resistances introduced by the other decades. It is also noted that the use of the described bridge circuit desirably causes the resistance between the output terminals 42 and 43 to remain substantially constant no matter what the suppression voltage setting and value.

The attenuators 1 and 2

As noted previously herein, one purpose of the attenuators 1 and 2 is to provide a span adjusting means in the apparatus; that is, a means for causing the apparatus output voltage always to have a single, predetermined span, such as 2.5 millivolts, for example, for different input voltages of various spans. To this end, the attenuators 1 and 2 cooperate in the illustrated apparatus to attenuate the input voltage so that, no matter what its span (within the range for which the apparatus is designed), a variation in the input voltage between its highest and lowest values will always result in a variation 2.5 millivolts in the value of the output voltage.

The four ganged span switches 13, 14, 24, and 25 provide a coarse setting for the attenuators, which are to be adjusted, at any given time, for the span of the particular input voltage to be conditioned at that time. To this end, each of the eleven positions of these switches is identified, as shown in FIG. 2, by a particular span value. A fine span setting for the attenuators is provided by the adjustable span multiplying resistor 26, which multiplies the setting value of the span switches by from 1 to 2.5 as its contact is moved from the top to the bottom of the resistor body as shown in FIG. 4. Therefore, by means of the span switches and the resistor 26 together, and hence by means of the knobs 37 and 40, the apparatus can be set for the exact span of the input voltage to be conditioned.

The switches 13 and 14 and associated resistors in the attenuator 1 attenuate the input voltage by three different amounts as these switches are adjusted through their eleven positions. Specifically, the attenuator 1 attenuates the input voltage in the ratio of 1:1 for the 5, 10, 20, 30, and 50 millivolt switch positions or span settings, in the ratio of 10:1 for the 100, 200, and 500 millivolt settings, and in the ratio of 100:1 for the 1000, 2000, and 5000 millivolt settings. For each of these three attenuation values, the switches 24 and 25 and associated resistors in the attenuator 2 further attenuate the input voltage by successively larger amounts as the span switches are advanced. For example, in the 5 millivolt position, the attenuator 1 provides an attenuation of 1:1, while the attenuator 2 provides an attenuation of 2:1, giving a total attenuation of 2:1. In the 20 millivolt position, the attenuator 1 still provides an attenuation of 1:1, but the attenuator 2 now provides an attenuation of 8:1, giving a total attenuation of 8:1. In the 200 millivolt position, the attenuator 1 now provides an attenuation of 10:1, while the attenuator 2 again provides its 8:1 attenuation, giving a total attenuation of 80:1.

In connection with the present description, it is noted that the specific span and other values being referred to in this description are merely those of a particular apparatus which has been constructed according to the present invention, and are being referred to herein solely to facilitate the describing of the invention. These values are by no means to be considered as being the only ones with which either the illustrated apparatus, or any other apparatus embodying the invention, is operable.

To the end of providing the foregoing attenuation actions, the attenuator 1 input terminal 9 is connected through the calibrating switch 12, when the latter is in the normal operating position as shown in FIG. 2, to the arm of the switch 13. The first five contacts of the switch are strapped together and connected through the resistor 15 to the attenuator output terminal 10. Said strapped contacts are also connected to the first contact of the switch 14, the arm of which is connected to the terminal 10.

As a result of these connections, the attenuator 1 provides a 1:1 attenuation, or a straight-through connection, when the span switches are in their first five positions. In all except the first of these positions, this connection includes in series the resistor 15. Although shown in the circuit of the attenuator 1, the resistor 15 electrically forms a part of the attenuator 2, as will be explained below.

In the attenuator 2, the input terminal 21 is connected to the arm of the switch 24, while the first two contacts of the latter are connected to the common terminal 23 through the resistors 28, 26, 29, 30, and 31 connected in series. The contact of the resistor 26 is connected to the arm of the switch 25, while the first contact of the latter is connected through the resistor 32 to the output terminal 22. As a result of these connections, the attenuator 2 provides an attenuation of 2:1 when the span switches are in the first position and the contact of the span resistor 26 is in its uppermost position in FIG. 4. This 2:1 attenuation coupled with the corresponding 1:1 attenuation produced by the attenuator 1 gives the desired over-all attenuation of 2:1 for the first or 5 millivolt span position.

The above 2:1 attenuation is produced in the following manner. The complete circuit for the apparatus when in the 5 millivolt position can be traced from the input terminal 5 through the conductor 88 to the terminal 9, through the switches 12, 13, and 14 to the terminal 10, through the conductor 89, the device 3, and the conductor 90 to the terminal 21, through the switch 24 and the resistor 28 to the contact of the resistor 26, through the switch 25 and the resistor 32 to the terminal 22, and through the conductor 91 to the output terminal 7. Also, the contact of the resistor 26 is connected through the latter and the resistors 29, 30, and 31 and the terminal 23 to the common conductor 92 which interconnects the input terminal 6 and the output terminal 8.

The resistances of the device 3 and of the resistors 28, 26, 29, 30, and 31 in the above circuit form a voltage divider for the input voltage. The resistances of the resistors 28, 26, 29, 30, and 31 are so chosen, taking into account the fixed resistance of the device 3, that the ratio of the total of these resistances to the sum of the resistances of the resistors 26, 29, 30, and 31 is 2:1. It is this 2:1 voltage divider which provides the 2:1 input voltage attenuation specified above.

In the circuit just described, the resistors 28, 26, 29, 30, and 31 are voltage divider resistors, while the resistor 32 raises to a desired value the impedance of the apparatus output, looking back from the output terminals 7 and 8. The resistors 30 and 31, together with the resistor 29, provide fine and course adjustments of the resistance of the lower, output half of the voltage divider, to permit this resistance to be set to the value necessary to give the desired attenuations and output voltage values.

For the second or 10 millivolt position of the span switches, the attenuator resistor 15 is switched into the circuit in series with the resistor 28, which causes the voltage divider now to give the required attenuation of 4:1. Also at this time, the resistor 32 is replaced by the adjustable resistor 27, which is connected between the last ten contacts of the switch 25 and the output terminal 22. This resistor maintains the output impedance of the apparatus substantially constant when the ganged resistor 26 is adjusted to increase the attenuation ratio above the values corresponding to the settings of the span switches.

As the span switches are advanced to the 20, 30, and 50 millivolt span positions, the resistor 15 remains a part of the voltage divider, and the resistors 33, 34, and 35 are progressively added to the voltage divider to increase the attenuation ratio to the required respective values of 8:1, 12:1, and finally 20:1. For this purpose, the resistor 33 is connected between the upper end of the resistor 28 and the 20 millivolt switch contact, while the resistor 34 is connected between the latter contact and the 30 millivolt contact. Finally, the resistor 35 is connected between the last-mentioned contact and the input terminal 21, making it unnecessary to have any connection to the 50 millivolt contact. The resistances of the resistors involved are chosen so as to provide the desired voltage divisions and voltage attenuation. Through these span settings, the attenuation provided by the attenuator 1 remains at 1:1 as noted hereinbefore.

As was noted previously herein, the attenuator 1 provides an input voltage attenuation of 10:1 for the next three span switch settings: namely, the 100, 200, and 500 millivolt settings. To this end, a voltage divider using the resistors 16 and 17 is brought into the active circuit of the attenuator 1 for these three settings. Specifically, the 100, 200, and 500 millivolt contacts of the switch 13 are connected together and through the resistor 17 to the connected 100, 200, and 300 millivolt contacts of the switch 14, while the latter contacts are connected through the resistor 16 to the common terminal 11. The ratio of the sum of the resistances of the resistors 16 and 17 to the resistance of the resistor 16 is made to be 10:1 in order to provide the required 10:1 attenuation.

As the span switches are advanced to the 100, 200, and 500 millivolt positions, the attenuation provided by the attenuator 2 is caused to be the required 4:1, 8:1, and 20:1, respectively. This is accomplished by having the 100 millivolt contact of the switch 24 connected to the 10 millivolt contact, the 200 millivolt contact connected to the 20 millivolt contact, and the 500 millivolt contact left unconnected as is the 50 millivolt contact. These attenuations, coupled with the 10:1 attenuation now provided by the attenuator 1, give the respective, required, over-all attenuations of 40:1, 80:1, and 200:1.

As was also noted previously herein, the attenuator 1 provides an attenuation of 100:1 for the last three, highest span switch settings: namely, the 1000, 2000, and 5000 millivolt settings. To this end, a voltage divider using the resistors 19 and 20 is brought into the active circuit of the attenuator 1 for these three settings, and the resistor 18 is added to the voltage divider in the attenuator 2 as the resistor 15 was added for the 10 to 50 millivolt positions. Specifically, the 1000, 2000, and 5000 millivolt contacts of the switch 13 are connected together and through the resistors 19 and 18 in series to the connected upper three contacts of the switch 14, while the junction between the resistors 19 and 18 is connected by the resistor 20 to the common terminal 11. The ratio of the sum of the resistances of the resistors 19 and 20 to the resistance of the resistor 20 is made to be 100:1, as necessary to provide the required 100:1 attenuation.

As the span switches are advanced to the 1000, 2000, and 5000 millivolt positions, the attenuator 2, utilizing the resistor 18 as part of its voltage divider, provides the required attenuations of 4:1, 8:1, and 20:1, respectively. To this end, the 1000 millivolt contact of the switch 24 is connected to the 100 and 10 millivolt contact, the 2000 millivolt contact is connected to the 200 and 20 millivolt contacts, and the 5000 millivolt contact is left unconnected as are the 500 and 50 millivolt contacts. These attenuations, coupled with the 100:1 attenuation now provided by the attenuator 1, give the respective, required, over-all attenuations of 400:1, 800:1, and 2000:1. The resistor 18 permits the same values of the resistors in the attenuator 2 to give the same 4:1, 8:1, and 20:1 attenuations in combination with both the 100:1 and the 10:1 attenuator 1 voltage dividers, notwithstanding the fact that these two dividers present different net resistances to the attenuator 2 input.

As mentioned hereinbefore, a second purpose of the attenuator 1 is to extend or increase the effective range over which the suppression voltage output of the device 3 is adjustable, without necessitating any corresponding addition or change to the circuitry of the device 3 itself. This is accomplished by connecting the attenuator 1 in the series circuit bebtween the input terminals 5 and 6 and the device 3. By virtue of this connection, any setting and corresponding suppression voltage output of the device 3 becomes ten times more effective as the attenuator 1 is shifted from a span setting wherein it produces an attenuation of 1:1, to a span setting wherein it produces an attenuation of 10:1. Similarly, any suppression voltage value in the output of the device 3 is made to have the effect of a voltage one-hundred times greater when the attenuator 1 is shifted from an attenuation of 1:1 to an attenuation of 100:1.

Specifically, the foregoing means that the effective suppression voltage in the apparatus is equal to the actual value of voltage appearing between the suppression terminals 42 and 43 for span settings of 5, 10, 20, 30, or 50 millivolts, but is ten times greater than said actual value for span settings of 100, 200, or 500 millivolts. Further, the effective suppression voltage value is equal to one-hundred times the said actual value when the span switches are set for span values of 1000, 2000, or 5000 millivolts. The result of this is that the digital suppression voltage value indication provided by the series or row of digit indicating devices 64, 71, 72, and 73 is correct for the span switch settings of 5, 10, 20, 30, or 50 millivolts, and must be multiplied by ten for settings of 100, 200, or 500 millivolts, and must be multiplied by one-hundred for settings of 1000, 2000, or 5000 millivolts.

*Decimal point device 4*

The decimal point display device 4 provides the required multiplication of the digital suppression voltage indication noted above. To this end, and as shown in FIGS. 1 and 5, the device 4 incorporates three indicating or decimal point displaying lamps 100, 101, and 102. The device 4 is so positioned with respect to the row of digital indicating devices 64, 71, 72 and 73 that the lamp 100 lies between the units device 71 and the tenths device 72, the lamp 101 lies between the latter and the hundredths device 73, and the lamp 102 lies just to the right of the latter. As a result, the illumination of the lamp 100 displays a decimal point between the units and tenths digits, and thus provides a multiplication factor of unity. Similarly, the illumination of the lamp 101 provides a multiplication factor of ten, and the illumination of the lamp 102 provides a multiplication factor of 100.

Therefore, it is necessary that the lamp 100 be illuminated whenever the span switches are in the first five or 5, 10, 20, 30, or 50 millivolt positions (initial attenuation of 1:1), that the lamp 101 be illuminated for the next three or 100, 200, and 500 millivolt positions (initial attenuation of 10:1), that the lamp 102 be illuminated for the last-three or 1000, 2000, and 5000 millivolt positions (initial attenuation of 100:1). To accomplish this, the device 4 includes an eleven-contact switch 103 forming a fifth section of the span switch gang.

The arm of the switch 103 is ganged to those of the other four span switches by the linkage 36. This arm is electrically connected to one of a pair of energizing terminals 104 and 105 which are arranged to be connected to a source of lamp energizing voltage, not shown. The first five contacts of the switch 103 are strapped together and connected through the lamp 100 to the other energizing terminal 105. The next three contacts of this switch are strapped together and connected through the lamp 101 to the terminal 105. Finally, the last three contacts of the switch 103 are strapped together and connected through the lamp 102 to the terminal 105.

*The calibrating switches*

Before concluding this description of the illustrated apparatus, the purposes of the ganged calibrating switches 12 and 44 will be described. These switches have three positions. In the first or + position, shown in FIGS. 2 and 3, the upper section of the switch 12 in the attenuator 1 connects the input terminal 9 to the arm of the span switch 13 as previously described. In this same position, the switch 44 in the device 3 connects the supply terminals 84 and 85 to the bridge circuit in such a manner that the bridge input terminal 93 is made positive with respect to the terminal 94. This causes the suppression voltage to make the terminal 42 positive, and hence causes suppression voltage to be subtracted from the input voltage (positive suppression), assuming that the latter makes the input terminal 5 positive with respect to the terminal 6.

When the switches 12 and 44 are in the second or — position, the upper section of the switch 12 connects the input to the span switch 13 as before. However, the switch 44 now reverses the connection of the terminals 84 and 85 to the bridge circuit, so that the terminal 93 is now made negative with respect to the terminal 94. This causes the suppression voltage to make the terminal 42 negative and to be added to the input voltage (negative suppression).

When the switches 12 and 44 are in the third or CALIBRATE (CAL.) position, the upper section of the switch 12 disconnects the input terminal 9 and the input voltage from the span switch and the entire apparatus, while the lower section of the switch 12 effectively short-circuits the apparatus input. The switch 44 now connects the terminals 84 and 85 to the bridge as in the — position. The suppression voltage is now available in the apparatus as a source of calibrating voltage to aid in the adjustment of the various calibrating resistors in adjusting the apparatus to match the measuring instrument with which the apparatus is to be used.

In conclusion, it is seen that the novel apparatus according to the present invention is characterized by its simplicity and versitility, resulting from the novel four resistor decades and the extension of the range of the suppression device by the split attenuator. It is seen also that this apparatus is characterized by its practicability, resulting from the novel suppression bridge circuit with its constant output impedance and its equal resistance values for the tens and units decades.

What is claimed is:

1. Voltage conditioning apparatus, comprising a pair of input terminals arranged for connection to a source of input voltage, a pair of output terminals, a suppression voltage device having a pair of suppression terminals and adjustable means producing between said suppression terminals a suppression voltage of a value dependent upon the adjustment of said adjustable means, means connecting said suppression terminals in a series loop circuit with said input and output terminals, a first adjustable voltage attenuator connected in said circuit between said input terminals and said suppression terminals for attenuating solely said input voltage by an amount dependent upon the adjustment of said first attenuator, and a second adjustable voltage attenuator connected in said circuit between said suppression terminals and said output terminals for attenuating the resultant of said attenuated input and suppression voltages by an amount dependent upon the adjustment of said second attenuator.

2. Apparatus as specified in claim 1, wherein said suppression voltage device includes digital display means connected to and actuated by said adjustable means for digitally displaying the value of said suppression voltage, wherein there are decimal point display means associated with said digital display means for displaying the decimal value of said suppression voltage, and wherein said decimal display means is connected to and actuated by said first attenuator for adjustment as the value of said input voltage is adjusted by said first attenuator.

3. Voltage conditioning apparatus, comprising a pair of input terminals arranged for connection to a source of input voltage, a pair of output terminals, a suppression voltage device having a bridge circuit including a pair of suppression terminals, a pair of energizing terminals arranged to be connected to a source of voltage for producing a suppression voltage between said suppression terminals, a first bridge arm connected between one of said energizing terminals and one of said suppression terminals and including first summing resistance means, a second bridge arm connected between said one of said energizing terminals and the other of said suppression terminals and including second summing resistance means, multi-position switching means adjustable into a plurality of positions, the number of which equals the number of incremental changes to be produced in the value of said suppression voltage by the adjustment of said switching means throughout its successive positions, a plurality of resistors, the total number of which is substantially less than said number of suppression voltage changes, and connections between said resistors, said switching means, said suppression terminals, and the other of said energizing terminals to cause predetermined ones of said resistors to form a third bridge arm, between said other energizing terminal and said one suppression terminal, and a fourth bridge arm, between said other energizing and suppression terminals, as said switching means is adjusted through its said successive positions, the resistance values of said resistors being so related that the adjustment of said switching means through its said successive positions causes said suppression voltage value to change by successive equal increments according to the decimal system, means connecting said suppression terminals in a series loop circuit with said input and output terminals, a first adjustable voltage attenuator connected in said circuit between said input terminals and said suppression terminals for attenuating solely said input voltage by an amount dependent upon the adjustment of said first attenuator, and a second adjustable voltage attenuator connected in said circuit between said suppression terminals and said output terminals for attenuating the resultant of said attenuated input and suppression voltages by an amount dependent upon the adjustment of said second attenuator.

4. Voltage conditioning apparatus, comprising a pair of input terminals arranged for connection to a source of input voltage, a pair of output terminals, a suppression voltage device having a bridge circuit including a pair of suppression terminals, a pair of energizing terminals arranged to be connected to a source of voltage for producing a suppression voltage between said suppression terminals, a first bridge arm connected between one of said energizing terminals and one of said suppression terminals and including first summing resistance means, a second bridge arm connected between said one of said energizing terminals and the other of said suppression terminals and including second summing resistance means, multi-position switching means adjustable into ten different positions, the difference between any successive two of which represents an equal incremental change in the value of said suppression voltage, four resistors, the resistance values of which are in the ratio of 4:2:2:1, and connections between said resistors, said switching means, said suppression terminals, and the other of said energizing terminals to cause predetermined ones of said resistors to form a third bridge arm, between said other energizing terminal and said one suppression terminal, and a fourth bridge arm, between said other energizing and suppression terminals, and to cause said suppression voltage value to change by successive equal digital increments over a decimal decade, as said switching means is adjusted through its said ten successive positions, means connecting said suppression terminals in a series loop circuit with said input and output terminals, a first adjustable voltage attenuator connected in said circuit between said input terminals and said suppression terminals for attenuating solely said input voltage by an amount dependent upon the adjustment of said first attenuator, and a second adjustable voltage attenuator connected in said circuit between said suppression terminals and said output terminals for attenuating the resultant of said attenuated input and suppression voltages by an amount dependent upon the adjustment of said second attenuator.

5. Voltage conditioning apparatus, comprising a pair of input terminals arranged for connection to a source of input voltage, a pair of output terminals, a suppression voltage device having a bridge circuit including a pair of suppression terminals, a pair of energizing terminals arranged to be connected to a source of voltage for producing a suppression voltage between said suppression terminals, a first bridge arm connected between one of said energizing terminals and one of said suppression terminals and including first summing resistance means, a second bridge arm connected between said one of said energizing terminals and the other of said suppression terminals and including second summing resistance means, a first multi-position switching means adjustable into a plurality of positions, the number of which equals the number of incremental changes to be produced in the value of said suppression voltage by the adjustment of said switching means throughout its successive positions, a first plurality of resistors, connections between said resistors, said switching means, said suppression terminals, and the other of said energizing terminals to cause predetermined ones of said resistors to form a third bridge arm, between said other energizing terminal and said one suppression terminal, and a fourth bridge arm, between said other energizing and suppression terminals, as said switching means is adjusted through its said successive positions, the resistance values of said resistors being so related that the adjustment of said switching means through its said successive positions causes said suppression voltage value to change by successive increments, a second multi-position switching means adjustable into a plurality of positions, the number of which equals the number of incremental changes to be produced in the value of said suppression voltage by the adjustment of said second switching means throughout its successive positions, a second plurality of resistors, and connections between said second resistors, said second switching means, said other energizing terminal, and said first and second summing resistance means to cause predetermined ones of said second resistors to be connected in paths between said other energizing terminal and each of said summing resistance means as said second switching means is adjusted through its said successive positions, the resistance values of said second resistors being equal to those of the corresponding ones of said first resistors to cause the adjustment of said second switching means through its said successive positions to cause said suppression voltage value to change by successive increments which are related by a factor of ten to the corresponding increments by which the first-mentioned switching means changes said suppression voltage value, means connecting said suppression terminals in a series loop circuit with said input and output terminals, a first adjustable voltage attenuator connected in said circuit between said input terminals and said suppression terminals for attenuating solely said input voltage by an amount dependent upon the adjustment of said first attenuator, and a second adjustable voltage attenuator connected in said circuit between said suppression terminals and said output terminals for attenuating the resultant of said attenuated input and suppression voltages by an amount dependent upon the adjustment of said second attenuator.

6. Voltage conditioning apparatus, comprising a pair of input terminals arranged for connection to a source of input voltage, a pair of output terminals, a suppression voltage device having a bridge circuit including a pair of suppression terminals, a pair of energizing terminals arranged to be connected to a source of voltage for producing a suppression voltage between said suppression terminals, a first bridge arm connected between one of said energizing terminals and one of said suppression terminals and including first summing resistance means, a second bridge arm connected between said one of said energizing terminals and the other of said suppression terminals and including second summing resistance means, a first multi-position switching means adjustable into ten different positions, the difference between any successive two of which represents an equal incremental change in the value of said suppression voltage, four resistors, the resistance values of which are in the ratio of 4:2:2:1, and connections between said resistors, said switching means, said suppression terminals, and the other of said energizing terminals to cause predetermined ones of said resistors to form a third bridge arm, between said other energizing terminal and said one suppression terminal, and a fourth bridge arm, between said other energizing and suppression terminals, and to cause said suppression voltage value to change by successive equal digital increments over a decimal decade, as said switching means is adjusted through its said ten successive positions, a second multi-position switching means adjustable into ten different positions, the difference between any successive two of which represents an equal incremental change in the value of said suppression voltage which is one-tenth of the first-mentioned change, a second group of four resistors, the resistance value of each of which is equal to the resistance value of the corresponding one of said first resistors, and connections between said second resistors, said second switching means, said other energizing terminal, and said first and second summing resistance means to cause predetermined ones of said second resistors to be connected in paths between said other energizing terminal and each of said summing resistance means, and to cause said suppression voltage value to change by successive digital increments which are equal to one-tenth of the first-mentioned increments, as said second switching means is adjusted through its said ten successive positions, means connecting said suppression terminals in a series loop circuit with said input and output terminals, a first adjustable voltage attenuator connected in said circuit between said input terminals and said suppression terminals for attenuating solely said input voltage by an amount dependent upon the adjustment of said first attenuator, and a second adjustable voltage attenuator connected in said circuit between said suppression terminals and said output terminals for attenuating the resultant of said attenuated input and suppression voltages by an amount dependent upon the adjustment of said second attenuator.

7. A voltage adjusting device comprising a bridge circuit including a pair of output terminals, a pair of input terminals arranged to be connected to a source of voltage for producing an output voltage between said output terminals, a first bridge arm connected between one of said input terminals and one of said output terminals and including first summing resistance means, a second bridge arm connected between said one of said input terminals and the other of said output terminals and including second summing resistance means, multi-position switching means adjustable into a plurality of positions, the number of which equals the number of incremental changes to be produced in the value of said output voltage by the adjustment of said switching means throughout its successive positions, a plurality of resistors, the total number of which is substantially less than said number of said output voltage changes, and connections between said resistors, said switching means, said output terminals, and the other of said input terminals to cause predetermined ones of said resistors to form a third bridge arm, between said other input terminal and said one output terminal, and a fourth bridge arm, between said other input and output terminals, as said switching means is adjusted through its said successive positions, the resistance values of said resistors being so related that the adjustment of said switching means through its said successive positions causes said output voltage value to change by successive equal digital increments according to the decimal system.

8. Apparatus as specified in claim 7 wherein there is provided a second multi-position switching means adjustable into a plurality of positions the number of which equals the number of incremental changes to be produced in said output voltage value by the adjustment of said second switching means throughout its successive positions a second plurality of resistors the total number of which is substantially less than said number of said output voltage changes to be produced by said second switching means and connections between said second switching means said other input terminal and said first and second summing resistance means to cause predetermined ones of said second resistors to bec onnected in paths between said other input terminal and each of said summing resistance means as said second switching means is adjusted through its said successive positions the resistance values of said second resistors being so related that the adjustment of said second switching means through its said successive positions causes said output voltage value to change by successive equal increments according to the decimal system which are related by a factor of ten to the corresponding increments by which the first-mentioned switching means changes said output voltage value.

9. Apparatus as specified in claim 8 wherein the number and resistance values of said second resistors are equal respectively to the number and resistance values of the first mentioned resistors.

10. A voltage adjusting device comprising a bridge circuit including a pair of output terminals a pair of input terminals arranged to be connected to a source of voltage for producing an output voltage between said output terminals a first bridge arm connected between one of said input terminals and one of said output terminals and including first summing resistance means a second bridge arm connected between said one of said input terminals and the other of said output terminals and including second summing resistance means, multi-position switching means adjustable into ten different positions the difference between any successive two of which represents an equal incremental change in the value of said output voltage four resistors the resistance values of which are in the ratio of 4:2:2:1 and connections between said resistors said switching means said output terminals and the other of said input terminals to cause predetermined ones of said resistors to form a third bridge arm between said other input terminal and said one output terminal and a fourth bridge arm between said other input and output terminals and to cause said output voltage value to change by successive equal digital increments over a decimal decade as said switching means is adjusted through its said ten successive positions.

11. Apparatus as specified in claim 10, wherein there is provided a second multi-position switching means adjustable into ten different positions, the difference between any successive two of which represents an equal incremental change in the value of said output voltage which is related to the first-mentioned change by a factor of ten, a second group of four resistors, the resistance values of which are in the ratio of 4:2:2:1, and connections between said second group of resistors, said second switching means, said other input terminal, and said first and second summing resistance means to cause predetermined ones of said second group of resistors to be connected in paths between said other input terminal and each of said summing resistance means, and to cause said output voltage value to change by successive equal digital increments over a decimal decade, as said second switching means is adjusted through its said ten successive positions, the last-mentioned and first-mentioned decades being related by a factor of ten.

12. Apparatus as specified in claim 11, wherein the resistance value of each of said second group of resistors is equal to the resistance value of the corresponding one of the first-mentioned resistors.

13. A voltage adjusting device comprising a bridge circuit including a pair of output terminals, a pair of input terminals arranged to be connected to a source of voltage for producing an output voltage between said output terminals, a first bridge arm connected between one of said input terminals and one of said output terminals and including first summing resistance means, a second bridge arm connected between said one of said input terminals and the other of said output terminals and including second summing resistance means, a first multi-position switching means adjustable into a plurality of positions, the number of which equals the number of incremental changes to be produced in the value of said output voltage by the adjustment of said switching means throughout its successive positions, a first plurality of resistors, connections between said resistors, said switching mean, said output terminals, and the other of said input terminals to cause predetermined ones of said resistors to form a third bridge arm, between said other input terminal and said one output terminal, and a fourth bridge arm, between said other input and output terminals, as said switching means is adjusted through its said successive positions, the resistance values of said resistors being so related that the adjustment of said switching means through its said successive position causes said output voltage value to change by successive increments, a second multi-position switching means adjustable into a plurality of positions, the number of which equals the number of incremental changes to be produce in said output voltage value by the adjustment of said second switching means throughout its successive positions, a second plurality of resistors, and connections between said second resistors, said second switching means, said other input terminal, and said first and second summing resistance means to cause predetermined ones of said second resistors to be connected in paths between said other input terminal and each of said summing resistance means as said second switching means is adjusted through its said successive positions, the resistance values of said second resistors being equal to those of the corresponding ones of said first resistors to cause the adjustment of said second switching means through its said successive position to cause said output voltage value to change by successive increments which are related by a factor of ten to the corresponding increments by which the first-mentioned switching means changes said output voltage value.

14. A voltage adjusting device comprising a circuit including a pair of output terminals, a pair of input terminals arranged to be connected to a source of voltage for producing an output voltage between said output terminals, a first arm connected between one of said input terminals and one of said output terminals and including first summing resistance means, a second arm connected between said one of said input terminals and the other of said output terminals and including second summing resistance means, multi-condition switching means adjustable into a plurality of different conditions, the number of which at least equals the number of different values of said output voltage to be produced by the adjustment of said switching means throughout its different conditions, a plurality of resistors, the total number of which is substantially less than said number of said said output voltage values, and connections between said resistors, said switching means, said output terminals, and the other of said input terminals to cause predetermined ones of said resistors to form at least one of a third arm, between said other input terminal and said one output terminal, and a fourth arm, between said other input and output terminals, as said switching means is adjusted through its said different conditions, the resistance values of said resistors being so related that the adjustment of said switching means through its said different conditions causes said output voltage value to change by increments according to a logical counting system.

References Cited by the Examiner
UNITED STATES PATENTS 2,738,504   3/1956   Gray _____ 323—79
2,999,202   9/1961   Ule _____ 323—79 X LLOYD McCOLLUM, *Primary Examiner.*

A. D. PELLINEN, *Assistant Examiner.*